(12) United States Patent
Yajaman et al.

(10) Patent No.: US 7,844,975 B2
(45) Date of Patent: Nov. 30, 2010

(54) MOCK EXCEPTIONS IN A HOST ADD-IN ENVIRONMENT

(75) Inventors: Naveen Yajaman, Bellevue, WA (US);
Glenn Morton, Bellevue, WA (US);
Apurva Sinha, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 11/807,060

(22) Filed: May 25, 2007

(65) Prior Publication Data

US 2008/0294883 A1    Nov. 27, 2008

(51) Int. Cl.
*G06F 13/00* (2006.01)
(52) U.S. Cl. .................. 719/319; 709/201; 709/217; 714/48; 714/49
(58) Field of Classification Search .................. 719/319; 709/201, 217; 714/48, 49
See application file for complete search history.

(56) References Cited

U.S. PATENT DOCUMENTS

| | | | |
|---|---|---|---|
| 6,339,832 B1 | 1/2002 | Bowman-Amuah | |
| 6,477,665 B1 | 11/2002 | Bowman-Amuah | |
| 6,502,213 B1 | 12/2002 | Bowman-Amuah | |
| 6,883,172 B1 | 4/2005 | Angeline et al. | |
| 6,901,588 B1 | 5/2005 | Krapf et al. | |
| 6,968,538 B2 | 11/2005 | Rust et al. | |
| 7,086,066 B2 | 8/2006 | Kappel et al. | |
| 7,194,744 B2 | 3/2007 | Srivastava et al. | |
| 7,484,209 B2 * | 1/2009 | Avakian et al. | 718/1 |
| 7,519,976 B2 * | 4/2009 | Blevins | 719/328 |

OTHER PUBLICATIONS

"In Design CS/InCopy CS Plug-in Development Training" Date: Mar. 2004, pp. 1-45, Adobe Developer Technologies.
"Introducing Outlook Add-in Support in Visual Studio 2005 Tools for Office".
"PDC05—Managed AddIn Framework (MAF)".

* cited by examiner

*Primary Examiner*—Andy Ho
(74) *Attorney, Agent, or Firm*—Ogilvie Law Firm

(57) ABSTRACT

Mock exceptions, including mock exception types, are defined by a host to be raised in a plug-in. The mock exceptions might be sanitized. They might be transported from the plug-in to the host. Mock exceptions might also be mapped to real exceptions, which are raised in the host and handled by the host.

20 Claims, 7 Drawing Sheets

```
class ClassUsingLogging {
     Function ProcessSomething() {
          Try {
               //Do some processing here
          }
          Catch(AddInExceptionType addInException) {
               // This is the processing for all exceptions
               LoggingSystemWithOldApproach.Log(addInException);
          }
     }
} class LoggingSystemWithOldApproach {
   Function Log(AddInExceptionType addInException) {
     String message = addInException.Message;

string exceptionType = ParseMessageForExceptionType(message);
     if (exceptionType != null) {
        if( exceptionType.Equals("KeyNotFoundException",
StringComparison.InvariantCultureIgnoreCase)) {
          // Log the exception information
        }
        else if(...) {
          // Log the exception information
        }
     }
     else {
        WriteToLogFile("Unknown Exception type", ErrorType.Error, message);
     }
   }

Function ParseMessageForExceptionType(String exceptionMessageString) {
     string exceptionType = null;
     // Parse the string that contains the information for "KeyNotFoundException: ....."
     return exceptionType;
   }
}
```

Fig. 5

```
class ClassUsingLogging {
    Function ProcessSomething() {
        Try {
            //Do some processing here
        }
        Catch(KeyNotFoundException ke) {
            //Do not do anything
        }
        Catch(CriticalException ce) {
            LoggingSystemWithNewApproach.Log(ce);
        }
        Catch(AddInExceptionType addInException) {
            //Display message to the user
        }
    }
} class LoggingSystemWithNewApproach {
    // Writes to the appropriate location
    LogWriter logWriter = new LogWriter();

Function Log(AddInExceptionType addInExceptionInstance) {
        if (addInException != null) {
            KeyNotFoundException exception = addInException as KeyNotFoundException;
            if(exception != null ) {
                exception.Log(logWriter);
            }
        }
    }
}
```

Fig. 6

```
//Host Application side
class CustomException : Exception {
    private int someNumber;
    public CustomException(string message)
        : base(message) { }
    Protected CustomException( SerializationInfo info, StreamingContext context)
        : base(info, context)
    { this.someNumber = info.GetInt32("someNumber"); }
    public override void GetObjectData(SerializationInfo info, StreamContext context)
    { base.GetObjectData(info, context);
        info.AddValue("someNumber", this.someNumber); }
}

// Tool Generated code Add-In side
partial class CustomException : Exception {
    private int someNumber;
    public CustomException() {}
    public CustomException(string message)
        : base(message) { }
}

// Extended code Add-In side
partial class CustomException : Exception {
    protected CustomException(SerializationInfo info, StreamingContext context)
        : base(info, context)
    { this.someNumber = info.GetInt32("someNumber");
    public override void GetObjectData(SerializationInfo info, StreamingContext context)
    { base.GetObjectData(info, context);
        Info.AddValue("someNumber", this.someNumber); }
}
```

Fig. 7

MOCK EXCEPTIONS IN A HOST ADD-IN ENVIRONMENT

BACKGROUND

An exception is an event that disrupts the normal flow of instructions during execution of a computer program. Exceptions are generally but not exclusively used to signal error conditions, such as an unexpected null pointer encountered during an attempt to access memory, a malformed structure encountered during parsing, or a lack of resources encountered during execution. Conditions that may cause a resource exception include memory full, network connection failed, and others.

Exception handling is the process of dealing with an exception. The handling process may include saving state information, updating a log, printing an error message, retrying an operation, trying an operation with different parameters and/or trying an alternate operation, converting an exception from one type to another type for handling by code elsewhere in the program, and/or other operations. Exception handling mechanisms may allow a program designer to centralize exception handling for easier maintenance or modifications by providing ways to separate, from the main logic of a program, the details of what to do when something out of the ordinary happens during execution.

Some software architectures allow a host program to interact with a plug-in program. Plug-ins are sometimes called add-ins. A plug-in may be provided and updated by a different vendor than the host that runs the plug-in. The allowed interactions between the host and the plug-in are specified in an API or other interface contract. Supporting plug-ins allows a host program to provide its users with additional functionality while nonetheless hiding implementation details in the plug-in. Accordingly, a host need not always depend on a particular plug-in implementation, but could rely instead only on the functionality specified in the contract between the host and the plug-in.

Software architectures that provide exception handling mechanisms do not necessarily also support plug-ins. Likewise, architectures that support plug-ins do not necessarily also provide exception handling mechanisms.

Indeed, a tension exists when designing an architecture that includes both exception handling and plug-ins. One program design approach would centralize exception handling code, so that all exceptions caused by network connection failures are handled in a consistent way, for example. A second approach would hide exception handling and other plug-in implementation details inside the plug-in, so that plug-in data structures and algorithms can be modified without changing the host code, for example. The first approach views the host and plug-ins as if they are a single program, in which exception handling and other operations should be centralized for consistency and efficiency. The second approach views the host as being largely separate from the plug-ins, in that each code component should keep its implementation details separate from the other, in order to allow greater flexibility to their respective vendors. In particular, the second approach favors plug-in version changes that are transparent to users of the host.

SUMMARY

In some embodiments, a mock exception is raised in a plug-in. The mock exception is serialized for transport, possibly together with information about the context in which the mock exception was raised. The serialized mock exception and any desired context information are transported from the plug-in to the host. In the host, serialized data is deserialized, and the exception is handled further. Some embodiments also include sanitizing the mock exception, which is done in the plug-in and/or in the host. The terms "mock exception" and "sanitizing" are among the terms that have special meaning herein, as discussed in detail below.

Although many of the examples given herein are methods, other embodiments are also discussed, such as systems and configured computer-readable storage media, for instance. The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The present invention is defined by the claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine the invention's scope.

FIG. 5 is a sample source code listing illustrating an approach which fails to fully utilize features discussed herein;

FIG. 6 is a sample source code listing illustrating aspects of some embodiments; and FIG. 7 is a sample source code listing illustrating automatically generated code for use in some embodiments.

DETAILED DESCRIPTION

Overview

Figure 1:
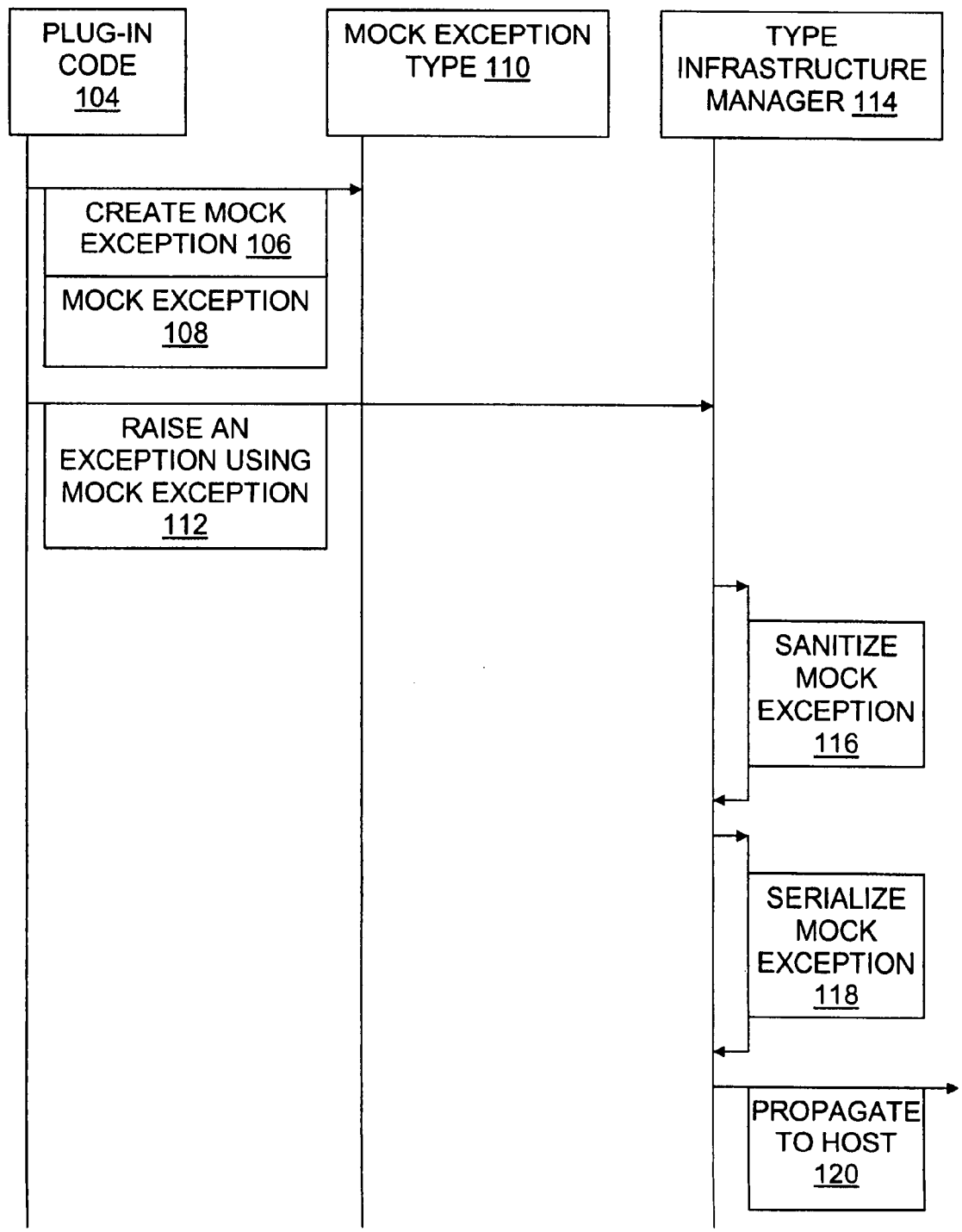
FIG. 1 is a data flow diagram illustrating plug-in side environment for an embodiment.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. The inventors assert and exercise their right to their own lexicography. Terms may be defined, either explicitly or implicitly, here in the Detailed Description and/or elsewhere in the application file.

As used herein, a "mock exception" is an exception, exception type, and/or exception-related code that is defined by program code of a host, for an exception which is instantiated and raised in the plug-in, and which is transported with any desired context from a plug-in to the host. By contrast, a "real exception" is defined by the operating infrastructure, or is defined by the host but raised only in the host. Examples of operating infrastructures include the Microsoft Common Language Runtime environment, Microsoft .NET-connected environments, Component Object Model environments, and other operating systems, language implementations, and/or runtime environments. The terms ".NET" and "Microsoft .NET" are marks of Microsoft Corporation. A mock exception is often, but not necessarily always, primarily handled in the host, in the sense that the behavior in the plug-in side infrastructure involves gathering the context and serializing the data for transport to the host, rather than immediately and/or only handling the exception in the plug-in.

As used herein, "sanitizing" an exception involves checking to ensure that the types used in an implementation of the exception are serializable. This may include, for instance, checking type information and/or checking for hard version dependency. In some embodiments, including some embodiments that utilize the Microsoft® .NET software for connecting people, information, systems, and devices, some types are guaranteed not to change because they have a hard version dependency, and thus are effectively safe for transportation even if that is not expressly stated in their type specification. The terms ".NET" and "Microsoft .NET" are marks of Microsoft Corporation.

As used herein, a "host" program is a program that provides an interface to a plug-in or add-in program. A host may be a user application running on a network client or peer, such as a web browser or word processor, for instance, or the host may be a server-side program. A host may also run on a stand-alone computer system. The host and its plug-in(s) are subject to separate versioning, that is, one may be modified without necessarily modifying the other.

"Plug-in" and "add-in" are used interchangeably herein. A plug-in is meant to provide additional functionality to a host, at least from the perspective of the host's user, whether that user is human or software. In general, although a host may run without any plug-ins, or at least without some particular plug-in, a plug-in is not ordinarily used in production code without being connected with a host. Plug-ins are typically loaded at runtime, and they may be loaded in response to a particular demand placed on the host by a user. Dynamic linked libraries are one kind of plug-in. Other plug-in examples include, without limitation, web browser plug-ins and server-side plug-ins.

As used herein, a "computer system" or "computing system" may include, for example, one or more personal computers (portable or not), servers, personal digital assistants (PDA), cell or mobile phones, and/or device(s) having a processor controlled at least in part by instructions which may be in the form of software in memory and/or specialized circuitry. In particular, although it may occur that many embodiments run on personal computers, other embodiments may run on other computing devices, and any one or more such devices may be part of a given embodiment. Also, a host and plug-in run together on a single device in some embodiments, and they each run on a separate respective device in other embodiments.

Operating Environment

With reference to all Figures, an operating environment for an embodiment may include, for instance, a computing system 400 on which a host 202 and a plug-in 104 to the host are executing. An operating environment for an embodiment may include a device on which the host and plug-in are stored, thus configuring 402 the device's memory. A host and at least one plug-in are part of the illustrated embodiment's operating environment; some embodiments include multiple plug-ins.

Some software architecture embodiments allow the building of host programs customizable through plug-ins in a secure and version resilient environment. Some do this in a consistent manner, so that every mechanism in the architecture supports these characteristics.

The device's operating system might be any known or hereafter formed operating system or other code 440, but a framework within infrastructure code 438 or other mechanism for handling exceptions will be provided, whether as part of the operating system itself 440 or through another infrastructure. One suitable infrastructure 438 includes the Microsoft® Managed Add-in Framework software 436, which is Microsoft .NET-connected technology. But other infrastructures 438 may also be used, if they provide (or are at least consistent with) the operations discussed herein, such as raising exceptions, passing control/data between a plug-in and a host, and so on. The phrase "Managed Add-in Framework" is a mark of Microsoft Corporation.

The operating environment may be client-server networked 420, peer-to-peer networked 420, or a stand-alone (non-networked) environment.

Figure 2:
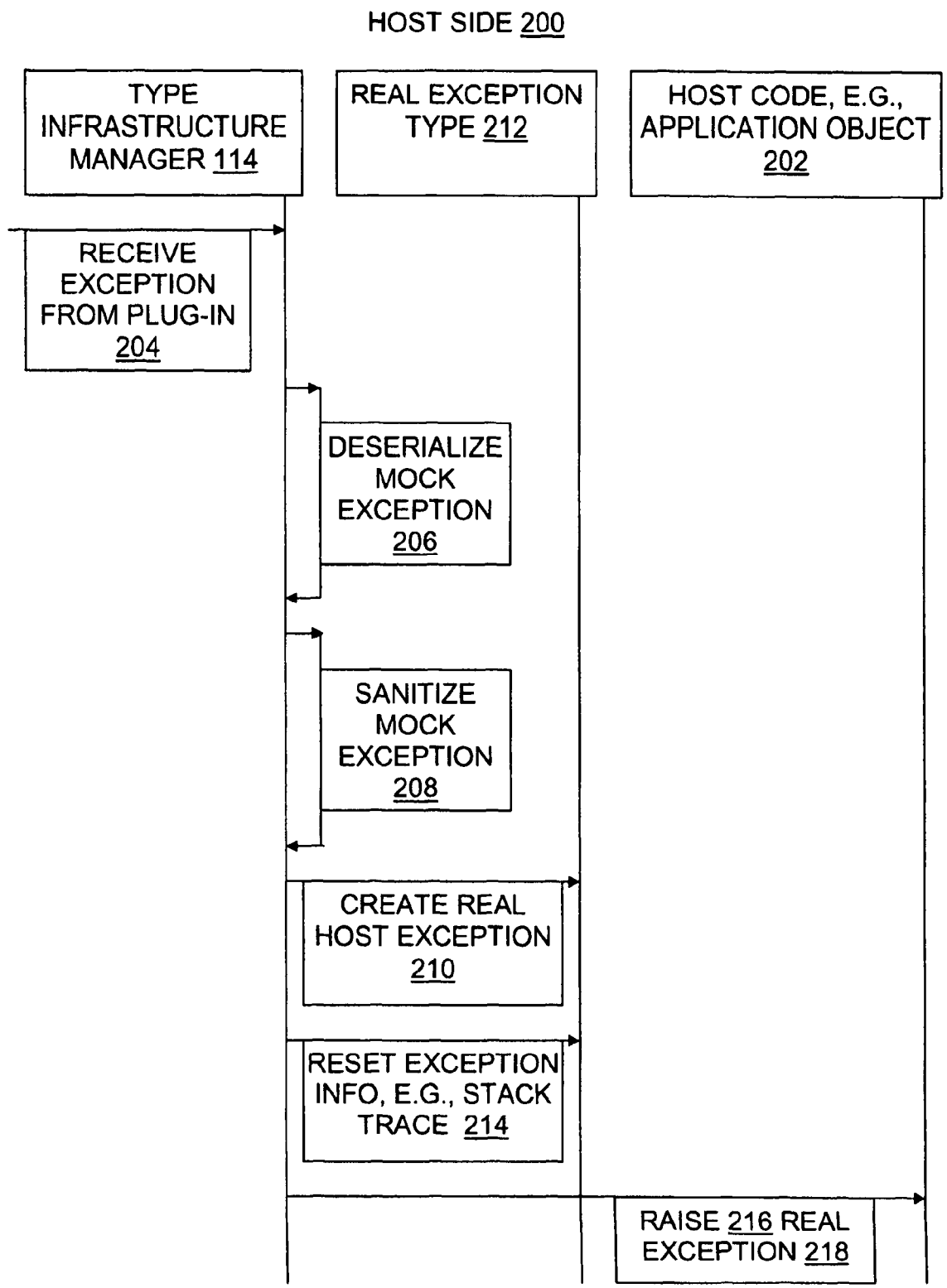
FIG. 2 is a data flow diagram illustrating host side environment for an embodiment.

FIGS. 1 and 2 illustrate some embodiments in an operating environment. On a plug-in side 100 of an API or other interface 102 between a plug-in 104 and a host 202, the plug-in 104 creates 106 a mock exception 108. This may be done, e.g., by instantiating a mock exception type 110 by invoking a public constructor for it.

At some point during execution of the plug-in 104, a condition specified for raising 112 the mock exception 108 is met. Execution then proceeds according to rules for passing control and context during an exception rather than the rules used during normal program execution. Exception processing, including the exception raising 112 and resulting exception control and data flow, may be implemented in part using programming language constructs such as try, catch, finally, and/or throw statements, for example.

In some embodiments, a type infrastructure manager 114 responds to the raised exception, not by handling it as a conventional exception, but rather by sanitizing 116 the mock exception, serializing 118 it after it has been sanitized, and then transporting 120 it to the host side 200 of the interface 102.

On the host side 200, the raised 112, sanitized 116, and serialized 118 mock exception 108 is received 204. This may be done, for instance, by reading data from a file or from a network connection. The exception, and any context info sent with it, is deserialized 206. In the illustrated embodiments, it is then sanitized 208 again. Then it is mapped to a real exception 218, namely, an exception that is not a mock exception as defined herein, to create 210 a real host exception. The real exception 218 may be of a type 212 that was previously defined in the host to be raised only in the host, for instance, or one defined at the system level in code 440 other than the host.

Some embodiments also change 214 context information for the raised 112 exception. For instance, an embodiment may change the stack trace to indicate that the real exception 218 stems from an exception raised in the plug-in 104 even though the real exception itself is raised 216 in the host.

Methods and Configured Media

Figure 3:
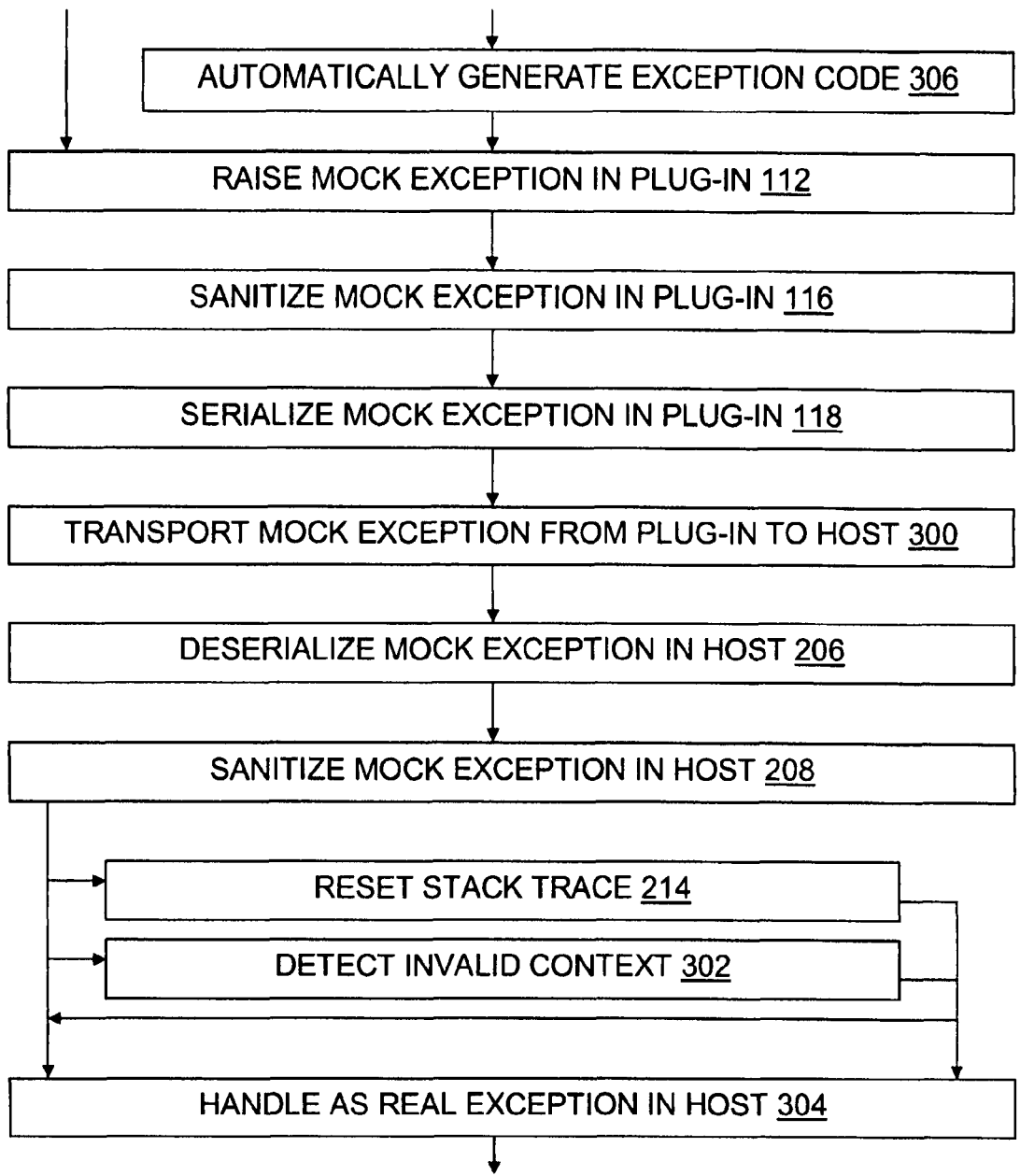
FIG. 3 is a flow chart illustrating steps of some method, configured storage medium, and other embodiments.

FIG. 3 illustrates some method embodiments. However, in a given embodiment zero or more illustrated steps of a method may be repeated, perhaps with different parameters or data to operate on. Steps in an embodiment may also be done in a different order, omitted, combined, or otherwise depart from the illustrated flow, provided that the method performed is operable and conforms with at least one claim.

Figure 4:
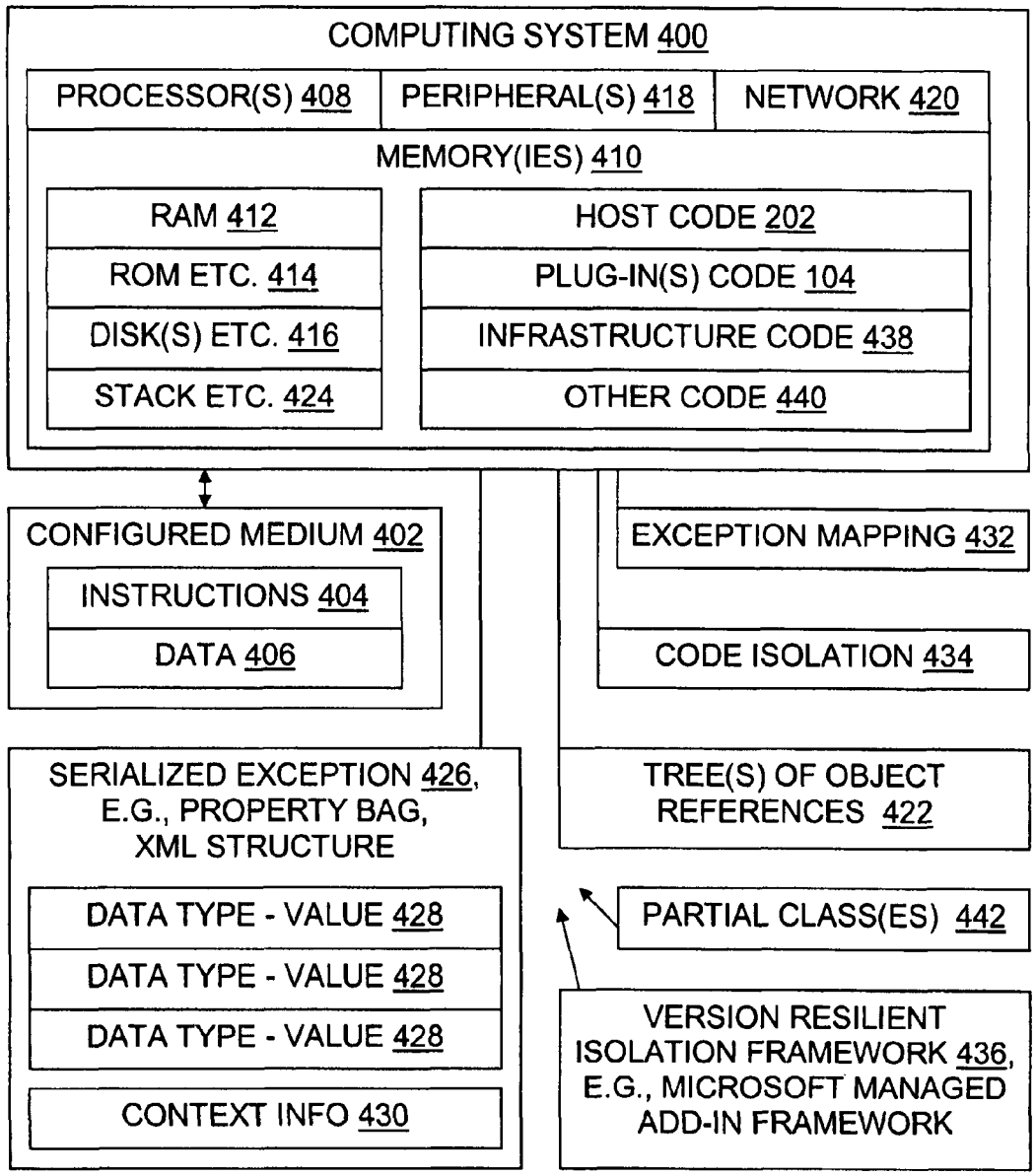
FIG. 4 is a block diagram illustrating some system and other embodiments.

With reference to FIGS. 3 and 4, in a computing system 400 embodiment, disks 416 (magnetic, optical, or otherwise), RAM 412, EEPROMS or other ROMs 414, and/or other configured storage media 402 can be provided. That is, a general-purpose storage medium, which may be removable or not, and may be volatile or not, is configured with data 406 and instructions 404 to thereby form a configured medium 402 which is capable of causing a device or other system 400 that also has a processor 408 to perform method steps disclosed herein. Such data 404 and instructions 406 may be part of or include the host code 202, the plug-in code 104, and/or infrastructure code 438, for example, as well as data structures discussed herein such as serialized exceptions 426, object trees 422, partial classes 442, and so on. Regardless, FIG. 3 helps illustrate configured storage media embodiments, and system embodiments, as well as illustrating method embodiments.

In one embodiment, during a method for exception handling a step 112 raises a mock exception 108 in a plug-in 104. The mock exception 108 is defined by a host; it may also have other characteristics as noted herein. It may be raised using standard language constructs, such as throw or assert statements.

A sanitizing step 116 sanitizes the mock exception. This may include, for example, recursively traversing a tree 422 of object references and checking for express serializability of the types in the tree that are used by the exception. It may also include checking for types whose implementations are guaranteed not to change, since those types can safely cross the interface 102 without type implementation conflicts arising, even if the version of the plug-in and/or the version of the host changes.

A serializing step 118 serializes the raised mock exception into a package 426, possibly together with information about the stack 424 contents and other context in which the mock exception was raised. Familiar serialization tools and techniques can be used. Serialization may be binary, e.g., using a property bag 426, or non-binary, e.g., using an XML structure 426 in a string or file. Regardless, variable values are associated (e.g., in pairs 428) with their respective variable data types, e.g., by canonical data type names known on both sides of the host plug-in boundary 102, during the serialization, and they are packaged 426 for transport across the interface 102.

A transporting step 300 transports the serialized 426 mock exception 108 and context information 430 from the plug-in to the host. Transporting may be viewed in some embodiments as having a sending step 120 and a receiving step 204, while it may be viewed in other embodiments as a unitary operation. Transporting 300 the mock exception may include transporting exception related data 430 in a property bag structure 426 and/or an XML structure 426, for instance. Transporting 300 may also be done using another data structure 426 which contains data values associated (in pairs 428, lists, a data dictionary, etc.) with corresponding expressly identified data types. Exception related data 430 may include an exception ID, stack contents, register contents, process/thread/application domain ID, and other contextual data, for example.

A deserializing step 206 may be substantially the inverse of the serializing step 118. Testing checksums or otherwise verifying data 426 integrity may be viewed in some embodiments as part of the transporting step 300, and it may be viewed in other embodiments as part of the deserializing step 206. The transported mock exception 108 and context information 430 are placed 206 in working memory 410 for subsequent handling 304 in the host.

A sanitizing step 208 sanitizes the deserialized mock exception on the host side 200. Like sanitizing step 116, this may include recursively traversing a tree 422 of object references and checking for serializability of the types in the tree that are used by the exception. But this host-side sanitizing step 208 may give different results than the plug-in side sanitizing step 116, because the mapping 432 between mock exceptions and real exceptions on the plug-in side 100 will not necessarily be a simple mirror image of the mapping 432 between real exceptions and mock exceptions on the host side 200. For example, in a configuration having a plug-in 104 version written originally for a given host 202 version but now plugged into a later host version, the new host may recognize or even expect a mock exception type that is not known to that plug-in.

Some of the illustrated embodiments include a step 214 of resetting or otherwise altering the exception information 430 received 204 at the host. In particular, the stack trace 424, 430 may be reset 214 to indicate during subsequent handling 304 that the underlying exception originated in the plug-in 104, rather than leaving in place a stack trace that would show the exception as originating 216 in the host.

Some of the illustrated embodiments include a step 302 of detecting an invalid mock exception context 430. That is, the context in which the mock exception was raised 112 may have changed in a way that suggests or requires a different response in the host than would be the case if the context had not so changed.

In particular, consider some embodiments that run in Microsoft® .NET-connected environments that have application domains 434 (a.k.a. AppDomains). Application domains help provide isolation, unloading, and security boundaries for executing managed code. They contain code, and they isolate code to limit the effects of erroneous or malicious code; application domains are similar in that respect to processes 434 used for code isolation. Indeed some embodiments, designed for operating in environments that use processes for code isolation, also perform a step 302 of detecting changes in the context 430 associated with those code isolation mechanisms 434 after mock exceptions are raised 112 in them.

In some embodiments that use application domains for code isolation 434, an application domain in which a mock exception was raised 112 may be recycled before the mock exception's corresponding real exception 218 is handled 304 in the host 202. This recycling makes the mock exception's context information 430 invalid. Accordingly, some embodiments detect 302 the application domain recycling as indicating an invalid context and then treat 210 the mock exception on the host side as an invalid stack real exception 218.

During illustrated step 304, the mock exception is effectively handled on the host side, possibly by handling a corresponding real exception 218 that is raised in response to the mock exception's receipt 204. Thus, handling 304 the mock exception may include raising 216 a real exception. But the mock exception may be handled 304 in other ways as well, such as by simply logging it without raising a real exception, and/or by passing a command and supporting data back to the plug-in 104. Some embodiments do not necessarily handle 304 every plug-in exception in a way that allows the plug-in to continue but instead seek to protect the host from unexpected unknown exceptions, by allowing only mock exceptions to be transported to the host.

In some embodiments only objects that are used in implementing mock exceptions (not objects used in implementing real exceptions) reach the plug-in. If sanitizing 116 detects that an object needed to implement a mock exception is missing, then in some embodiments the exception is not transported 300.

Some embodiments include a step 306 of automatically generating code to help implement mock exceptions. For instance, given real exception type information, a tool may automatically generate corresponding host side 200 and plug-in side 100 class constructs, including in some embodiments partial classes 442. An example is shown in FIG. 7.

More About Systems

With continuing attention to FIGS. 3 and 4, system 400 embodiments may include data, instructions, and equipment to implement operations such as those discussed here in connection with FIGS. 1 through 3. A computer 400, a collection of communicating computers 400, another computing device 400 such as a PDA, and/or a combination of devices 400, has one or more processors 408 and memory 410.

In many embodiments, peripheral equipment 418 such as human user I/O devices (screen, keyboard, mouse, microphone, speaker, motion sensor, etc.) will be present in operable communication with a processor 408 and memory 410. However, an embodiment 400 may also be deeply embedded in a larger system, so that no human user interacts directly with the embodiment.

Some embodiments 400 include two or more networked 420 computers. For instance, a mock exception 426 may be transported 300 over a network link 420 from a phone or PDA plug-in 104 to a service provider's server host process 202.

Not every component shown in FIG. 4 need be present in every system embodiment. Although implementation possibilities are illustrated here in text and drawings by specific examples, other embodiments may depart from these examples. For instance, specific features of an example may be omitted, renamed, grouped differently, repeated, instantiated in hardware and/or software differently, or be a mix of features appearing in two or more of the examples.

Additional Examples

Some embodiments provide a version resilient, type-safe, and secure handling of custom (host defined) exceptions 108 between the host application 202 and add-ins 104. With some other approaches, custom exceptions could not be transported between the add-in customization and the host application in a version-resilient, type-safe and secure manner. By contrast, some embodiments use the Microsoft® Managed Add-in Framework (MAF) 436 for version-resilience and isolation capabilities.

With some approaches, in order to ensure version-resilience and type-safety all of the relevant exception information are serialized into a string property on only one type of exception, which the add-in and the host agree upon as a MAF contract type that does not version. There are drawbacks to this approach, where the host and the add-in had to catch only one type of exception and then process the string information contained in that instance to retrieve the exception information. First, that process was not consistent with the modern programming language paradigm of structured exception handling. Second, the processing of information serialized as a string is error prone.

Some embodiments avoid these drawbacks. They allow developers to use structured exception handling paradigm when working with custom host defined exceptions 108. The developers can rely on standard programming language infrastructure 440 for compile time and runtime infrastructure 438 for handling exceptions in a robust manner.

One concern when propagating exceptions from add-ins 104 to hosts 202 is to ensure that the exceptions are safe and do not compromise the host. Some embodiments ensure that the exceptions transported 300 from the add-in to the host application are secure and sanitized type-safe to preserve the benefits of isolation, by intercepting the exception 108 flowing across the boundary 102 and inspecting 116, 208 the contents of the exception.

More generally, exception handling in a version-resilient and secure manner may be helpful to applications that allow customization 104 using plug-ins 104 that may be untrusted. Some embodiments address this, while using some semantics that developers are already familiar with.

Some embodiments provide a software device that facilitates version-resilient, type-safe and secure handling of custom exceptions propagated from the add-ins to the host applications. With other approaches, a developer might write code like that shown in FIG. 5, using a string to carry most or all of the information about exceptions and their context that will be used in handling the exceptions. With some embodiments, by contrast, a developer might write code like that shown in FIG. 6 for handling the exception in a manner which is more type-safe because it does not use strings in the manner of the FIG. 5 code. In embodiments like the one in FIG. 6, the developer is able to user structured exception handling when handling exceptions. Also, the developer is able to access the rich exception information in a type-safe manner. This helps developers focus on creating applications with robust exception handling.

Some embodiments have at least the following characteristics: mock exception types 108 for the add-ins 104; exception sanitization 116, 208 in the add-in and in the host application using the MAF infrastructure 436; serializing 118 the exception as a remote object instance 426, transporting 300 it in a property bag across the add-in and host boundary 102, and deserializing 206 the remote object instance into a host side exception 218 instance; and propagating 216 the exception using a standard exception handling paradigm on the host side 200.

In some embodiments, a mock exception type represents the exception type defined in the host object model but does not have any behavior associated with it in the add-in, other than serializing 118, and deserializing. Type infrastructure management is responsible for sanitization, not the mock exception type. A responsibility of this mock exception type 110 is to be a place-holder for the exception type defined in the host object model. The mock types 110 have capability to serialize and deserialize the data in the type. In one implementation, this is done by adding the constructors on the type to support serialization using the existing Microsoft® .NET infrastructure. Similar approaches may be taken in embodiments that do not rely on the .NET infrastructure. In some embodiments, behavior may be added to allow modification of data in the local instance but not on a remote instance, that is, not in the host application domain.

Some mock types 110 allow the exceptions to be raised from the add-in to the host application as with any other .NET framework defined exceptions. Some embodiments help ensure that these exceptions are not misused for compromising the host, since the exceptions 108 do not have any potentially harmful behavior associated with them. Some embodiments also support simple mock type code generation 306 from the existing exception types defined in the host object model using an automated tool based approach.

In some embodiments, a specific implementation of the mock types 110 contains only fields. Thus no behavior is associated with the type. The code that was generated in one implementation, e.g., code like that shown in FIG. 7, allows users/developers to extend the type with additional behavior by using the partial class construct provided in Microsoft® .NET technology.

In some embodiments, exception sanitization occurs both in the add-in and in the host application, using the MAF infrastructure. The exception raised 112 from the add-in is processed by the MAF infrastructure 436. Some embodiments 438 verify recursively every type embedded in the exception being propagated, for safety. This involves verifying the types for characteristics at least including serializability; non-versioning types may also be detected. The types may be verified to ensure they follow all the MAF rules, which are available through sources such as the MSDN® developer program; MSDN is a mark of Microsoft Corporation. Once the exception comes across the add-in host boundary 102, the embodiment code 438 sanitizes 208 the exception again before further processing.

Some embodiments include serializing the exception as an object instance, transporting it in a property bag across the add-in and host boundary, and deserializing the object instance into a host side exception instance. There are three main steps in this process in these embodiments.

First, as to serializing the exception, the sanitized mock exception type is serialized 118 using the MAF infrastructure 436 into an object 426 that can be safely transported across the add-in host boundary 102. This object has all the relevant information to be deserialized on the host side.

Second, as to transporting 300 the sanitized and serialized exception type across the add-in host boundary, this is done using the current MAF AddInException type data property bag 426. The AddInException is a MAF contract type and it is a safe type that derives from Exception type in the .NET framework 438. Some embodiments use unique value as a key in a data dictionary to transport the serialized custom exception across the add-in host boundary 102. Later this unique key value is used to obtain 204 this serialized custom exception entry 426 from the data dictionary.

Third, as to deserializing the exception, one deserialization process involves retrieving the exception type from the remote object instance using MAF infrastructure and then subjecting it to the deserialization process. One specific implementation addresses special conditions that occur when the add-in that is running in a separate .NET application domain 434 raises 112 an exception 108 and the application domain containing that add-in is recycled before the custom exception 108 is deserialized. In this case an AppDomainUnloaded will occur 302, which is handled appropriately, e.g., as an invalid stack exception 218.

Some embodiments use the standard exception handling paradigm to raise 216 the exception on the host side 200. Steps may be taken to help ensure that the information 430 specified when the exception was raised 112 on the add-in side 110 was preserved accurately. One piece of information, based on the location of the code where the exception is raised, is the stack 424 trace 430. To help ensure accurate debugging information, in some embodiments a stack trace property 430 is reset 214 to indicate that the add-in had raised the exception and not the host.

CONCLUSION

Although particular embodiments are expressly illustrated and described herein as methods or systems, it will be appreciated that discussion of one type of embodiment also generally extends to other embodiment types. For instance, the descriptions of methods in connection with FIG. 3 also help describe systems like those described in connection with FIG. 4, and vice versa. It does not follow that limitations from one embodiment are necessarily read into another.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification. Repeated claim language may be inserted outside the claims as needed.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for exception handling, comprising:
providing an exception mapping which maps a mock exception to a real exception, the mock exception being defined by code that is outside an operating infrastructure and is also outside a host, and the real exception being defined by code that is inside the operating infrastructure;
raising the mock exception in a plug-in which is plugged into the host, and
serializing the raised mock exception for transport from the plug-in to the host.

2. The method of claim 1, further comprising transporting the serialized mock exception from the plug-in to the host; and deserializing the transported mock exception for handling in the host.

3. The method of claim 2, further comprising sanitizing the mock exception in at least one of: the plug-in, the host.

4. The method of claim 1, wherein the method further comprises sanitizing the mock exception by recursively traversing a tree of object references checking types for serializability.

5. The method of claim 1, wherein the method further comprises transporting the mock exception by transporting data in at least one of: a property bag structure, an XML structure.

6. The method of claim 1, further comprising resetting a stack trace to indicate that the mock exception was raised in the plug-in.

7. The method of claim 1, further comprising automatically generating plug-in code to facilitate implementing the mock exception.

8. The method of claim 1, further comprising determining that an application domain containing the plug-in has been recycled, and then handling the mock exception as an invalid stack exception.

9. A computer system configured for exception handling, comprising:
   memory configured with computer-executable instructions;
   a processor, coupled with the memory, that executes the instructions for:
      raising a mock exception in a plug-in, the mock exception defined by a host;
      serializing the raised mock exception together with information about the context in which the mock exception was raised;
      transporting the serialized mock exception and context information from the plug-in to the host; and
      deserializing the transported mock exception and context information for handling in the host.

10. The system of claim 9, wherein the memory is configured with, and the processor executes, instructions for sanitizing the mock exception in the plug-in and instructions for sanitizing the mock exception in the host.

11. The system of claim 9, wherein the memory is further configured with a mapping in the host between mock exceptions and real exceptions, and a mapping in the plug-in between real exceptions and mock exceptions.

12. The system of claim 9, wherein the memory is configured with, and the processor executes, instructions for placing mock exception related data in at least one of: a property bag structure, an XML structure, a data structure which contains data values associated with corresponding expressly identified data types.

13. The system of claim 9, wherein the memory is configured with a partial class construct in implementing the mock exception.

14. The system of claim 9, wherein the memory is configured with, and the processor executes, instructions implementing a framework for version resilient isolation of a host from a plug-in to that host.

15. A configured storage medium in a system configured with data and instructions to cause at least one device having a processor and a memory to perform steps comprising a method for exception handling, the steps comprising:
   raising a mock exception in a plug-in of a host, the mock exception being one of multiple mock exceptions that are defined by the host;
   sanitizing the mock exception in the plug-in;
   serializing the raised mock exception;
   transporting the serialized mock exception from the plug-in to a host;
   deserializing the transported mock exception to the host; and
   sanitizing the mock exception in the host.

16. The configured storage medium of claim 15, wherein at least one sanitizing step includes checking types for serializability.

17. The configured storage medium of claim 15, wherein at least one sanitizing step includes checking for types which have a hard version dependency.

18. The configured storage medium of claim 15, wherein transporting the mock exception comprises transporting the mock exception in at least one of: a property bag structure, an XML structure.

19. The configured storage medium of claim 15, wherein the method steps further comprise raising an exception in the host in response to the mock exception.

20. The configured storage medium of claim 15, wherein the method steps further comprise resetting a stack trace to indicate that the mock exception was raised in the plug-in.

* * * * *

UNITED STATES PATENT AND TRADEMARK OFFICE
CERTIFICATE OF CORRECTION

PATENT NO. : 7,844,975 B2  Page 1 of 1
APPLICATION NO. : 11/807060
DATED : November 30, 2010
INVENTOR(S) : Naveen Yajaman et al.

It is certified that error appears in the above-identified patent and that said Letters Patent is hereby corrected as shown below:

In column 1, line 23, after "handling" insert -- code --.

Signed and Sealed this
Sixteenth Day of August, 2011

David J. Kappos
*Director of the United States Patent and Trademark Office*